(12) United States Patent
Fukunaga et al.

(10) Patent No.: US 10,577,051 B2
(45) Date of Patent: Mar. 3, 2020

(54) BICYCLE SPROCKET

(71) Applicant: SHIMANO INC., Sakai (JP)

(72) Inventors: Yasufumi Fukunaga, Sakai (JP); Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 224 days.

(21) Appl. No.: 15/705,484

(22) Filed: Sep. 15, 2017

(65) Prior Publication Data

US 2019/0084649 A1    Mar. 21, 2019

(51) Int. Cl.
*B62M 9/12* (2006.01)
*F16H 55/30* (2006.01)

(52) U.S. Cl.
CPC ............. *B62M 9/12* (2013.01); *F16H 55/30* (2013.01)

(58) Field of Classification Search
CPC ......... B62M 9/10; B62M 9/105; F16H 55/30; F16H 7/06; F16H 2055/306
USPC ........................................................ 474/160
See application file for complete search history.

(56) References Cited

U.S. PATENT DOCUMENTS

| | | | | |
|---|---|---|---|---|
| 5,133,695 A * | 7/1992 | Kobayashi | ............. | B62M 9/105 474/160 |
| 5,192,250 A * | 3/1993 | Kobayashi | ............... | B62M 9/10 474/160 |
| 5,437,582 A * | 8/1995 | Romano | ................... | B62M 9/10 474/156 |
| 5,503,598 A * | 4/1996 | Neuer | ...................... | B62M 9/10 474/160 |
| 5,545,096 A * | 8/1996 | Su | ............................. | B62M 9/10 474/160 |
| 5,632,699 A * | 5/1997 | Nakamura | ............... | B62M 9/10 474/160 |
| 5,662,541 A * | 9/1997 | Roovers | .................... | F16G 1/28 474/149 |
| 5,716,297 A * | 2/1998 | Bodmer | .................... | B62M 9/10 474/160 |
| 5,738,603 A * | 4/1998 | Schmidt | .................... | B62M 9/10 474/158 |
| 5,830,096 A * | 11/1998 | Schmidt | .................... | B62M 9/10 474/156 |
| 5,921,878 A * | 7/1999 | Young | ..................... | F16G 13/06 474/156 |
| 5,976,045 A * | 11/1999 | Young | ...................... | F16H 7/06 474/152 |

(Continued)

FOREIGN PATENT DOCUMENTS

CN         108725684        11/2018

*Primary Examiner* — Henry Y Liu
(74) *Attorney, Agent, or Firm* — Mori & Ward, LLP (57) ABSTRACT

A bicycle sprocket comprises a plurality of sprocket teeth including at least one first tooth and at least one second tooth. The at least one first tooth has a first non-driving surface including a first non-driving surface portion and a second non-driving surface portion so that a first ridge is formed between the first non-driving surface portion and the second non-driving surface portion. The at least one second tooth is configured to initially engage with the bicycle chain in a shifting operation. The at least one second tooth is disposed adjacent to the at least one first tooth. The at least one second tooth has a second non-driving surface including a third non-driving surface portion and a fourth non-driving surface portion so that a second ridge is formed between the third non-driving surface portion and the fourth non-driving surface portion.

10 Claims, 11 Drawing Sheets

(56) References Cited

U.S. PATENT DOCUMENTS

| | | | | |
|---|---|---|---|---|
| 5,984,817 | A * | 11/1999 | Schulz | F16H 7/06 474/156 |
| 6,007,442 | A * | 12/1999 | Schmidt | B62M 9/10 474/122 |
| 6,013,001 | A * | 1/2000 | Miyoshi | B62M 9/10 474/156 |
| 6,045,472 | A * | 4/2000 | Sung | B62M 9/10 474/158 |
| 6,090,003 | A * | 7/2000 | Young | F16H 55/30 474/152 |
| 6,139,456 | A * | 10/2000 | Lii | B62M 9/10 474/152 |
| 6,293,884 | B1 * | 9/2001 | Chattin | B62M 9/10 474/158 |
| 6,340,338 | B1 * | 1/2002 | Kamada | B62M 9/10 474/152 |
| 7,125,356 | B2 * | 10/2006 | Todd | F16H 55/30 474/152 |
| 7,258,638 | B2 * | 8/2007 | Valle | B62M 9/105 474/152 |
| 7,871,347 | B2 * | 1/2011 | Kamada | B62M 9/10 474/152 |
| 7,959,529 | B2 * | 6/2011 | Braedt | B62M 9/10 474/152 |
| 8,066,603 | B2 * | 11/2011 | Braedt | B62M 9/10 474/160 |
| 8,118,699 | B2 * | 2/2012 | Sakura | F16H 55/08 474/152 |
| 8,177,670 | B2 * | 5/2012 | Kamada | B62M 9/10 474/155 |
| 8,226,511 | B2 * | 7/2012 | Kamada | B62M 9/10 474/152 |
| 8,517,874 | B2 * | 8/2013 | Reiter | B62M 9/10 474/152 |
| 8,550,944 | B2 * | 10/2013 | Esquibel | B62M 9/10 474/160 |
| 2006/0154767 | A1 * | 7/2006 | Kamada | B62M 9/10 474/160 |
| 2009/0082147 | A1 * | 3/2009 | Braedt | B62M 9/10 474/160 |
| 2009/0098966 | A1 * | 4/2009 | Kamada | B62M 9/10 474/160 |
| 2009/0258740 | A1 * | 10/2009 | Valle | B62M 9/10 474/160 |
| 2009/0286639 | A1 * | 11/2009 | Sakura | F16H 55/08 474/152 |
| 2010/0081531 | A1 * | 4/2010 | Esquibel | B62M 9/10 474/160 |
| 2015/0240932 | A1 * | 8/2015 | Yokoyama | F16H 7/06 474/156 |
| 2016/0059930 | A1 * | 3/2016 | Fukunaga | B62M 9/10 474/160 |
| 2017/0029066 | A1 * | 2/2017 | Fukunaga | F16H 55/303 |
| 2018/0194433 | A1 * | 7/2018 | Dos Santos | B62M 9/1242 |
| 2018/0304965 | A1 * | 10/2018 | Fukumori | F16H 55/30 |

\* cited by examiner

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with a first aspect of the present invention, a bicycle sprocket comprises a sprocket body and a plurality of sprocket teeth. The plurality of sprocket teeth are provided on an outer periphery of the sprocket body. The plurality of sprocket teeth includes at least one first tooth and at least one second tooth. The at least one first tooth has a first driving surface and a first non-driving surface opposite to the first driving surface in a circumferential direction with respect to a rotational center axis of the bicycle sprocket. The first non-driving surface includes a first non-driving surface portion and a second non-driving surface portion so that a first ridge is formed between the first non-driving surface portion and the second non-driving surface portion. The at least one second tooth is configured to initially engage with the bicycle chain in a shifting operation where the bicycle chain shifts from an adjacent smaller bicycle sprocket to the bicycle sprocket. The at least one second tooth is disposed adjacent to the at least one first tooth without any tooth between the at least one first tooth and the at least one second tooth in the circumferential direction. The at least one second tooth has a second driving surface and a second non-driving surface opposite to the second driving surface in the circumferential direction. The second non-driving surface includes a third non-driving surface portion and a fourth non-driving surface portion so that a second ridge is formed between the third non-driving surface portion and the fourth non-driving surface portion.

With the bicycle sprocket according to the first aspect, it is possible to reduce the possibility that at least one of the at least one first tooth and the at least one second tooth interferes with inward shifting chain movement before the bicycle chain engages with the at least one second tooth in the inward shifting operation. Accordingly, it is possible to facilitate inward shifting operation.

In accordance with a second aspect of the present invention, a bicycle sprocket comprises a sprocket body and a plurality of sprocket teeth. The plurality of sprocket teeth are provided on an outer periphery of the sprocket body. The plurality of sprocket teeth includes at least one first tooth and at least one second tooth. The at least one first tooth has a first driving surface and a first non-driving surface opposite to the first driving surface in a circumferential direction with respect to a rotational center axis of the bicycle sprocket. The first non-driving surface includes a first circumferential outward convex portion. The at least one second tooth is configured to initially engage with the bicycle chain in a shifting operation where the bicycle chain shifts from an adjacent smaller bicycle sprocket to the bicycle sprocket. The at least one second tooth is disposed adjacent to the at least one first tooth without any tooth between the at least one first tooth and the at least one second tooth in the circumferential direction. The at least one second tooth has a second driving surface and a second non-driving surface opposite to the second driving surface in the circumferential direction. The second non-driving surface includes a second circumferential outward convex portion.

With the bicycle sprocket according to the first aspect, it is possible to reduce the possibility that at least one of the at least one first tooth and the at least one second tooth interferes with inward shifting chain movement before the bicycle chain engages with the at least one second tooth in the inward shifting operation. Accordingly, it is possible to facilitate inward shifting operation.

In accordance with a third aspect of the present invention, the bicycle sprocket according to any one of the first and second aspects is configured so that the at least one second tooth is disposed at an upstream side of the at least one first tooth in a driving rotational direction of the bicycle sprocket.

With the bicycle sprocket according to the third aspect, it is possible to further facilitate inward shifting operation, because the at least one first tooth that is disposed at a downstream side of the at least one second tooth in the driving rotational direction needs to release the bicycle chain before the at least one second tooth initially engages with the bicycle chain.

In accordance with a fourth aspect of the present invention, the bicycle sprocket according to the first aspect or the third aspect is configured so that the first ridge and the second ridge are disposed radially inwardly from a pitch circle of the bicycle sprocket with respect to the rotational center axis.

With the bicycle sprocket according to the fourth aspect, it is possible to further reduce the possibility that at least one of the at least one first tooth and the at least one second tooth interferes with inward shifting chain movement before the bicycle chain engages with the at least one second tooth in the inward shifting operation. Accordingly, it is possible to further facilitate inward shifting operation.

In accordance with a fifth aspect of the present invention, the bicycle sprocket according to the second aspect or the third aspect is configured so that each of at least a part of the first circumferential outward convex portion and at least a part of the second circumferential outward convex portion is disposed radially inwardly from a pitch circle of the bicycle sprocket with respect to the rotational center axis.

With the bicycle sprocket according to the fifth aspect, it is possible to further reduce the possibility that at least one of the at least one first tooth and the at least one second tooth interferes with inward shifting chain movement before the bicycle chain engages with the at least one second tooth in the inward shifting operation. Accordingly, it is possible to further facilitate inward shifting operation.

In accordance with a sixth aspect of the present invention, the bicycle sprocket according to any one of the first to fifth aspects is configured so that the at least one first tooth has a first tooth width along a first circular arc provided in a pitch circle of the bicycle sprocket between the first driving surface and the first non-driving surface in the circumferential direction. The at least one second tooth has a second tooth width along a second circular arc provided in the pitch circle between the second driving surface and the second non-driving surface in the circumferential direction. Each of the first tooth width and the second tooth width is equal to or shorter than 1.5 mm.

With the bicycle sprocket according to the sixth aspect, it is possible to further reduce the possibility that at least one of the at least one first tooth and the at least one second tooth interferes with inward shifting chain movement before the bicycle chain engages with the at least one second tooth in the inward shifting operation. Accordingly, it is possible to further facilitate inward shifting operation.

In accordance with a seventh aspect of the present invention, the bicycle sprocket according to any one of the first to sixth aspects is configured so that the at least one first tooth has a first tooth tip connecting the first driving surface and the first non-driving surface. The first tooth tip has a first length in the circumferential direction. The at least one second tooth has a second tooth tip connecting the second driving surface and the second non-driving surface. The second tooth tip having a second length in the circumferential direction. Each of the first length and the second length is equal to or shorter than 1.0 mm.

With the bicycle sprocket according to the seventh aspect, it is possible to further reduce the possibility that at least one of the at least one first tooth and the at least one second tooth interferes with inward shifting chain movement before the bicycle chain engages with the at least one second tooth in the inward shifting operation. Accordingly, it is possible to further facilitate inward shifting operation.

In accordance with an eighth aspect of the present invention, the bicycle sprocket according to any one of the first to seventh aspects is configured so that the at least one first tooth has a first tooth tip connecting the first driving surface and the first non-driving surface. The first tooth tip has a first length in the circumferential direction. The at least one second tooth has a second tooth tip connecting the second driving surface and the second non-driving surface. The second tooth tip has a second length different from the first length in the circumferential direction.

With the bicycle sprocket according to the eighth aspect, it is possible to set appropriate lengths of the first tooth tip and the second tooth tip based on the position relationship between the bicycle chain and each of the at least one first tooth and the at least one second tooth. Accordingly, it is possible to further facilitate inward shifting chain movement.

In accordance with a ninth aspect of the present invention, the bicycle sprocket according to the eighth aspect is configured so that the second length is longer than the first length.

With the bicycle sprocket according to the ninth aspect, it is possible to further reduce the possibility that the at least one first tooth interferes with inward shifting chain movement before the bicycle chain engages with the at least one second tooth in the inward shifting operation. Accordingly, it is possible to further facilitate inward shifting operation. In addition, it is possible to maintain strength of the at least one second tooth.

In accordance with a tenth aspect of the present invention, the bicycle sprocket according to any one of the first to ninth aspects is configured so that the sprocket body includes an outward facing side facing in an axial direction parallel to the rotational center axis and an inward facing side facing in the axial direction. The inward facing side is opposite to the outward facing side in the axial direction. The at least one first tooth includes an axially outward recess provided on an outward facing side facing in the axial direction to facilitate an inward shifting operation in which the bicycle chain is shifted from a smaller sprocket to the bicycle sprocket.

With the bicycle sprocket according to the tenth aspect, it is possible for the bicycle chain to move close to an axial center of the bicycle sprocket in the inward shifting operation. Accordingly, it is possible to further facilitate inward shifting chain movement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiment(s) will now be described with reference to the accompanying drawings, wherein like reference numerals designate corresponding or identical elements throughout the various drawings.

First Embodiment

Figure 1:
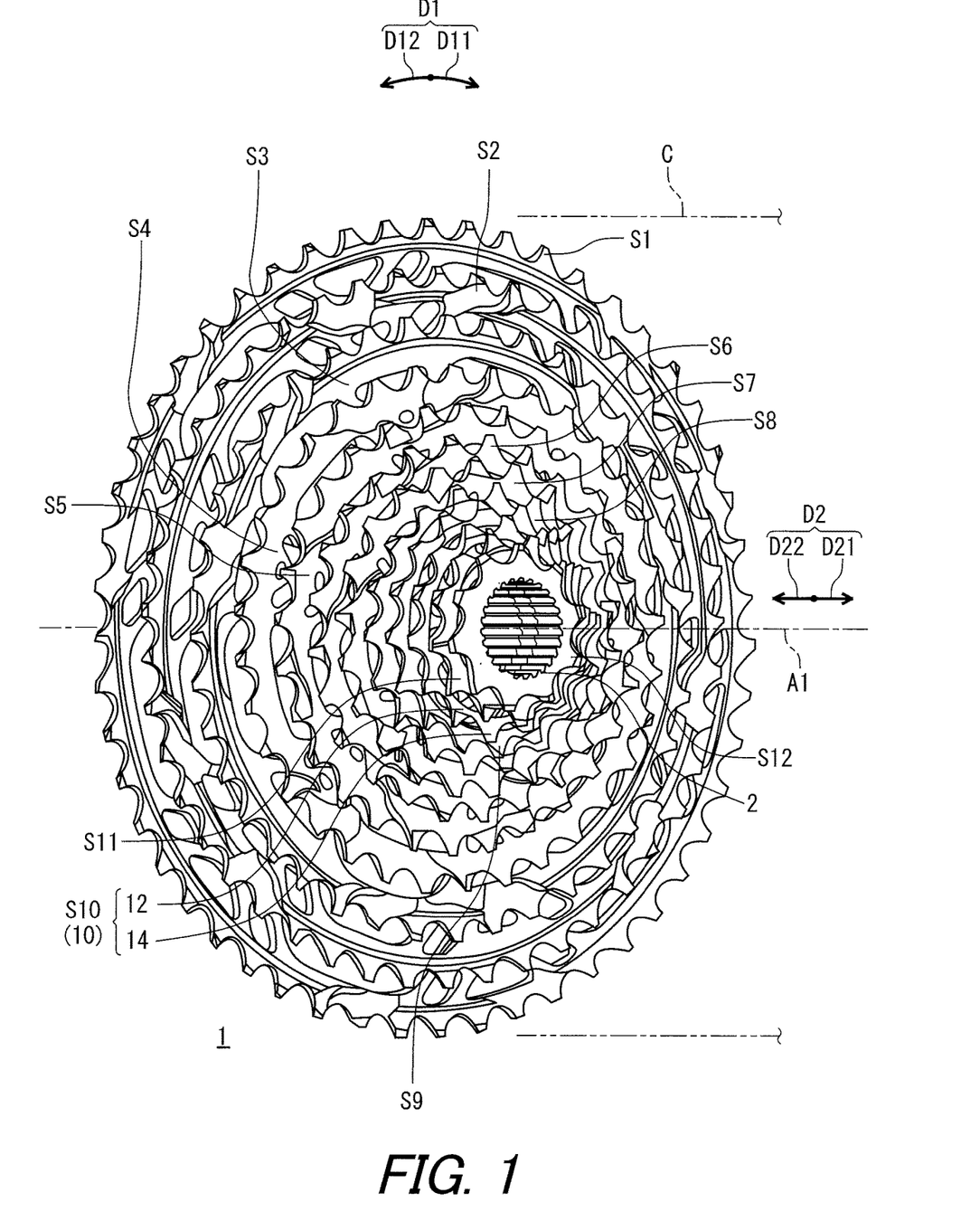
FIG. 1 is a perspective view of a bicycle multiple sprocket assembly including a bicycle sprocket in accordance with a first embodiment.

Referring initially to FIG. 1, a bicycle multiple sprocket assembly 1 including a bicycle sprocket 10 in accordance with a first embodiment is illustrated. The bicycle multiple sprocket assembly 1 is configured to engage with a bicycle chain C. In this embodiment, the bicycle multiple sprocket assembly 1 comprises twelve bicycle sprockets S1 to S12. The bicycle multiple sprocket assembly 1 has a rotational center axis A1. The bicycle multiple sprocket assembly 1 is rotatable about the rotational center axis A1 in a driving rotational direction D11 during the pedaling. The driving rotational direction D11 is defined along a circumferential direction D1 of the bicycle multiple sprocket assembly 1 with respect to the rotational center axis A1.

Figure 2:
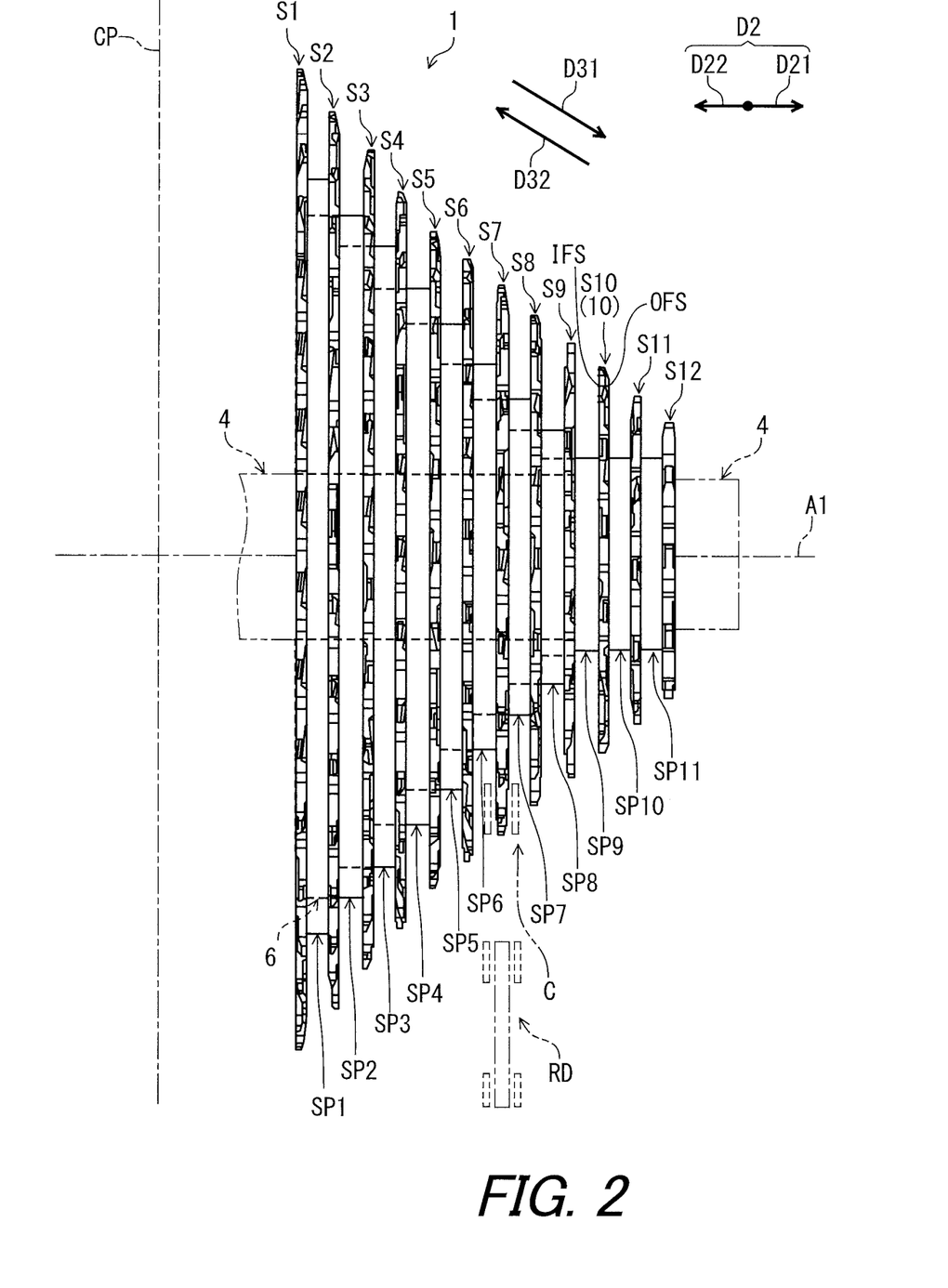
FIG. 2 is a front elevational view of the bicycle multiple sprocket assembly.

As seen in FIGS. 1 and 2, the bicycle multiple sprocket assembly 1 further comprises a hub engagement structure 2 configured to engage with a bicycle hub assembly 4. While the bicycle multiple sprocket assembly 1 is a bicycle rear sprocket assembly in the illustrated embodiment, structures of the bicycle multiple sprocket assembly 1 can be applied to a front sprocket assembly if needed and/or desired. Each of the bicycle sprockets S1 to S12 is a bicycle rear sprocket in this embodiment, and the structures of the bicycle sprockets S1 to S12 can be applied to a bicycle front sprocket.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle (not shown) of a bicycle with facing a handlebar (not shown). Accordingly, these terms, as utilized to describe the bicycle multiple sprocket assembly 1, should be interpreted relative to a bicycle (not shown) equipped with the bicycle multiple sprocket assembly 1 as used in an upright riding position on a horizontal surface.

As seen in FIG. 2, the bicycle sprockets S1 to S12 are arranged in an axial direction D2 parallel to the rotational center axis A1. The bicycle sprockets S1 to S12 are spaced apart from each other in the axial direction D2. The bicycle multiple sprocket assembly 1 includes spacers SP1 to SP11. Each of the spacers SP1 to SP11 is arranged between adjacent two sprockets of the bicycle sprockets S1 to S12. Inside such spacers, a sprocket support 6 to which a plurality of bicycle sprockets are mounted is used. However, the sprocket support 6 can be omitted. In such case, all sprockets S1 to S12 can be configured to directly engage with the bicycle hub assembly 4.

The bicycle sprocket S1 has an outer diameter which is largest in the bicycle sprockets S1 to S12. The bicycle sprocket S12 has an outer diameter which is smallest in the bicycle sprockets S1 to S12. The bicycle sprocket S1 is closer to a bicycle center plane CP of a bicycle frame (not shown) than the bicycle sprocket S12 in a state where the bicycle multiple sprocket assembly 1 is mounted to the bicycle hub assembly 4. For example, outward shifting occurs when the bicycle chain C is shifted by a rear derailleur RD from a larger sprocket to a neighboring smaller sprocket in an outward shifting direction D31. Inward shifting occurs when the bicycle chain C is shifted by the rear derailleur RD from a smaller sprocket to a neighboring larger sprocket in an inward shifting direction D32. In the present application, outward shifting operation and inward shifting operation can be collectively referred to as shifting operation.

The bicycle sprocket S10 will be described as a bicycle sprocket 10 in detail below. The bicycle sprockets S1 to S9, S11, and S12 have substantially the same structure as that of the bicycle sprocket 10. Thus, they will not be described in detail here for the sake of brevity.

As seen in FIG. 2, the bicycle sprocket 10 includes an outward facing side OFS and an inward facing side IFS. The outward facing side OFS faces in the axial direction D2 parallel to the rotational center axis A1. The inward facing side IFS faces in the axial direction D2. The inward facing side IFS is opposite to the outward facing side OFS in the axial direction D2. More specifically, the outward facing side OFS faces in an outward direction D21. The inward facing side IFS faces in an inward direction D22. The inward direction D22 is directed toward the bicycle center plane CP.

The outward direction D21 is a reverse direction of the inward direction D22. The axial direction D2 is a bidirectional direction including the outward direction D21 and the inward direction D22.

Figure 3:
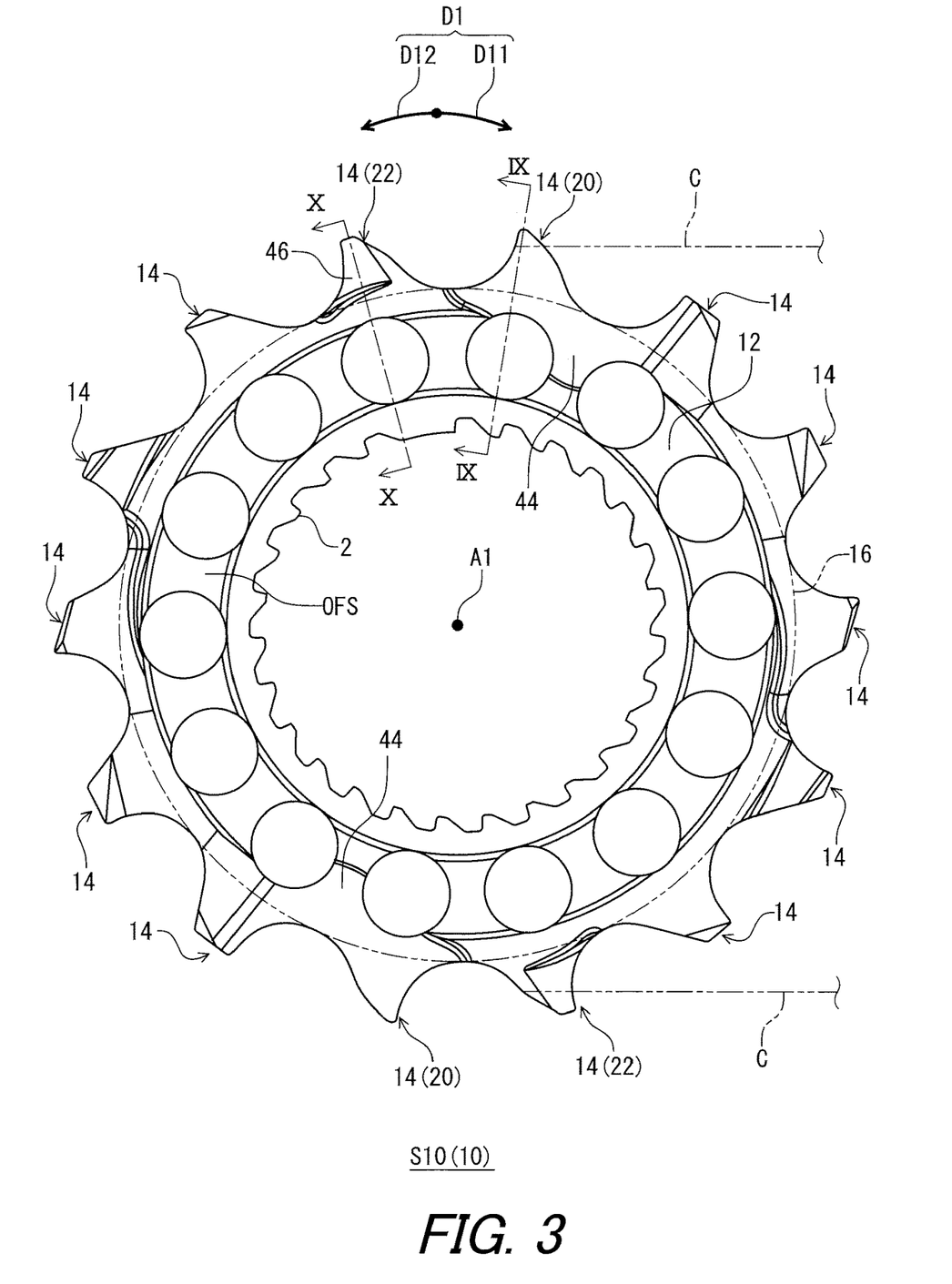
FIG. 3 is a side elevational view of the bicycle sprocket of the bicycle multiple sprocket assembly illustrated in FIG. 1.
Figure 4:
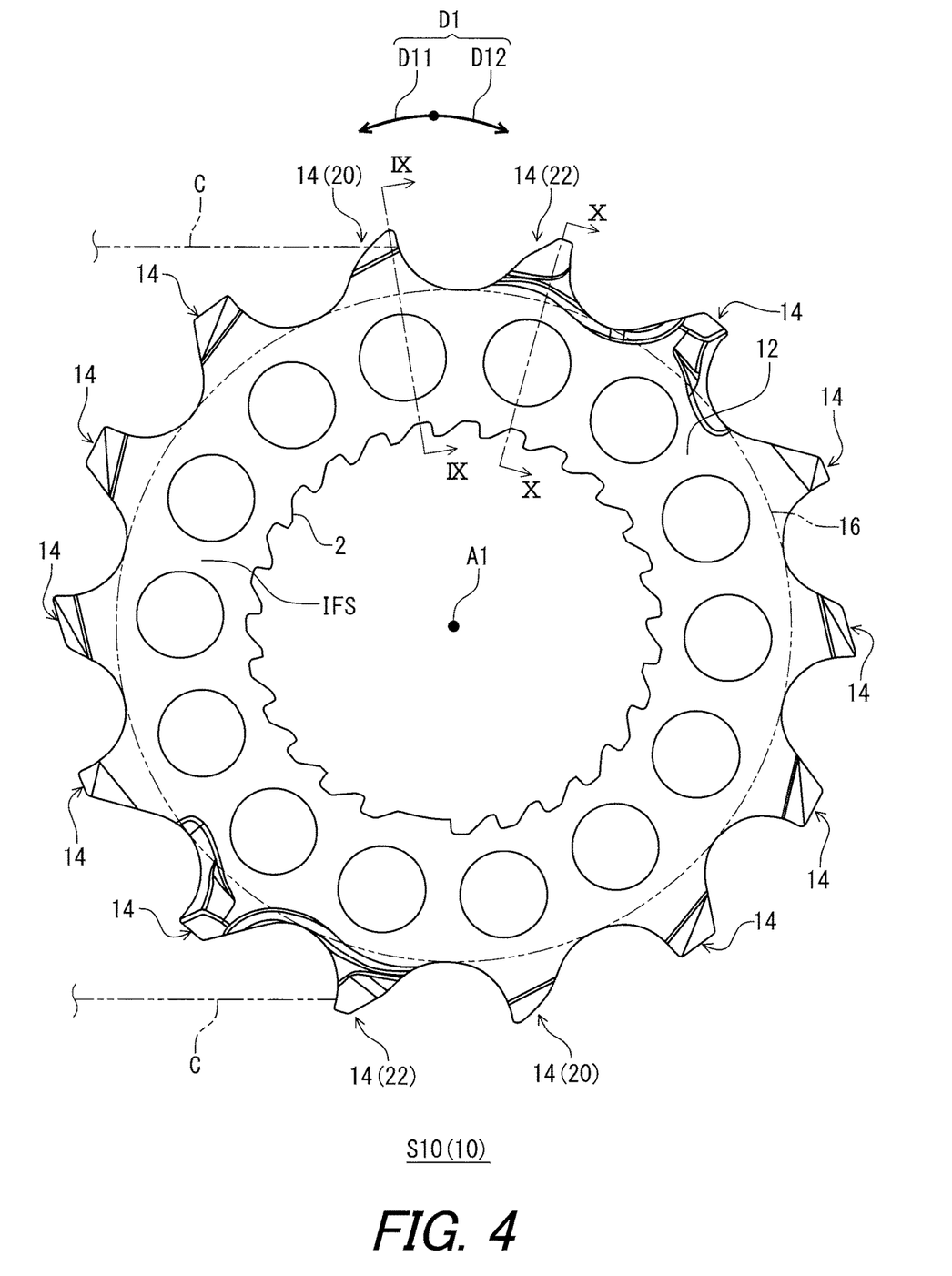
FIG. 4 is another side elevational view of the bicycle sprocket of the bicycle multiple sprocket assembly illustrated in FIG. 1.

FIG. 3 illustrates the outward facing side OFS of the bicycle sprocket 10. FIG. 4 illustrates the inward facing side IFS of the bicycle sprocket 10. As seen in FIGS. 3 and 4, the bicycle sprocket 10 comprises a sprocket body 12 and a plurality of sprocket teeth 14. The sprocket body 12 includes an outer periphery 16 provided about a rotational center axis A1 of the bicycle sprocket 10. The outer periphery 16 is a root circle of the bicycle sprocket 10. The plurality of sprocket teeth 14 are provided on the outer periphery 16 of the sprocket body 12. The plurality of sprocket teeth 14 are configured to engage with the bicycle chain C. The sprocket body 12 is configured to be rotatable about the rotational center axis A1. The plurality of sprocket teeth 14 extend radially outwardly from the outer periphery 16 of the sprocket body 12. The bicycle sprocket 10 can include the hub engagement structure 2 to directly engage with the bicycle hub assembly 4. However, the bicycle sprocket 10 can further include an attachment portion (not shown) to which the sprocket support 6 is attached in place of the hub engagement structure 2. In this case, the bicycle sprocket 10 can be mounted to the bicycle hub assembly 4 via the sprocket support 6.

As seen in FIGS. 3 and 4, the plurality of sprocket teeth 14 includes at least one first tooth 20 and at least one second tooth 22. The at least one first tooth 20 is configured to facilitate inward shifting operation. How to facilitate inward shifting operation is described below. The at least one second tooth 22 is configured to initially engage with the bicycle chain C in the shifting operation. More specifically, the at least one second tooth 22 is configured to initially engage with the bicycle chain C in the inward shifting operation. That is, the at least one second tooth 22 is configured to initially engage with the bicycle chain C in the shifting operation where the bicycle chain C shifts from an adjacent smaller bicycle sprocket to the bicycle sprocket 10. In a case where the bicycle sprocket 10 is the bicycle sprocket S10, the adjacent smaller bicycle sprocket is the bicycle sprocket S11. Preferably, a difference between a total number of sprocket teeth 14 of the bicycle sprocket 10 and a total number of sprocket teeth of the adjacent smaller sprocket is less than or equal to two. The at least one second tooth 22 is disposed adjacent to the at least one first tooth 20 without any tooth between the at least one first tooth 20 and the at least one second tooth 22 in the circumferential direction D1. More specifically, the at least one second tooth 22 is disposed at an upstream side of the at least one first tooth 20 in the driving rotational direction D11 of the bicycle sprocket 10. However, the at least one second tooth 22 can be disposed at both the upstream side and the downstream side of the at least one first tooth 20. Alternatively, the at least one second tooth 22 can be disposed at the downstream side of the at least one first tooth 20.

Figure 5:
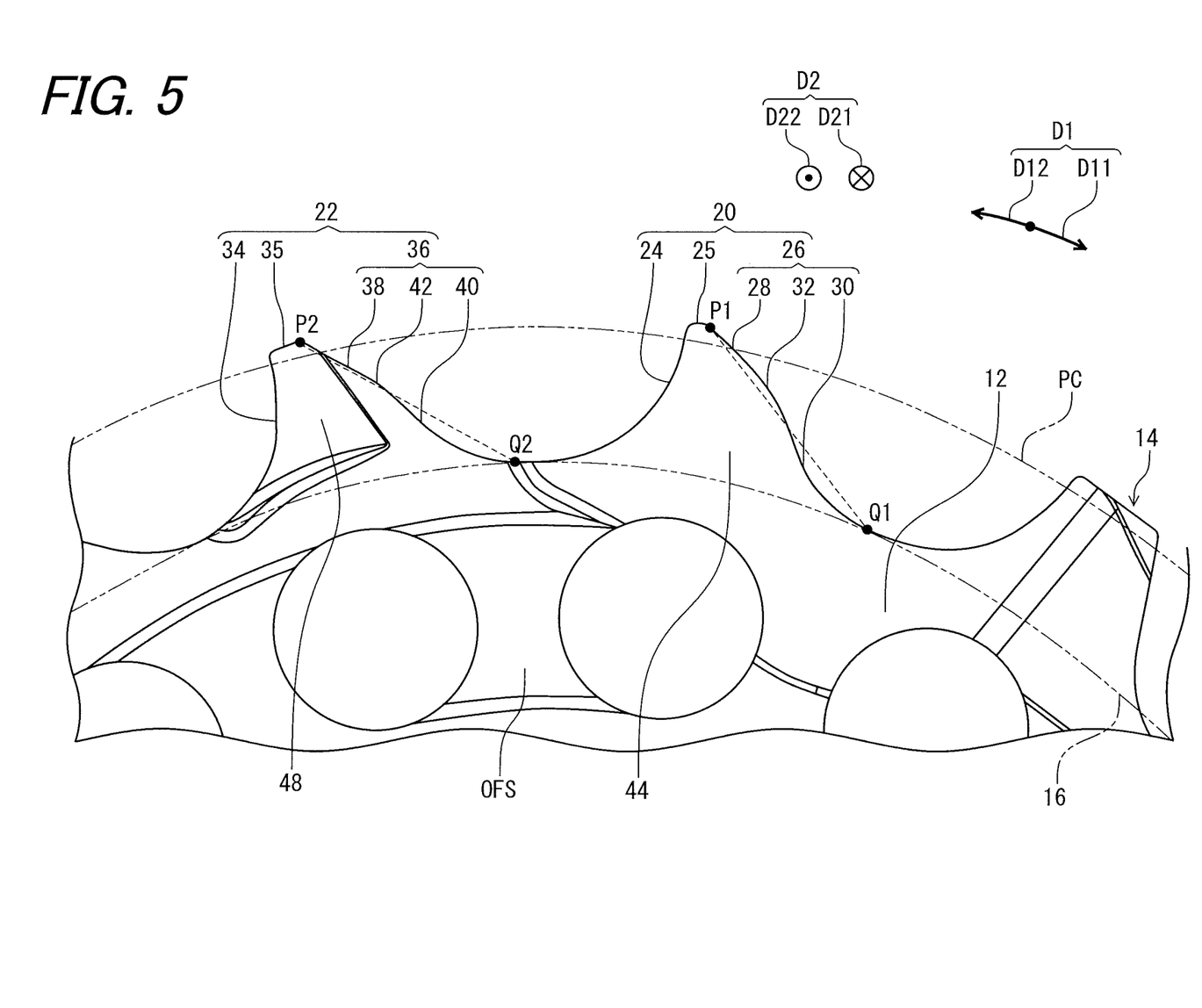
FIG. 5 is a partial side elevational view of the bicycle sprocket of the bicycle multiple sprocket assembly illustrated in FIG. 1.
Figure 6:
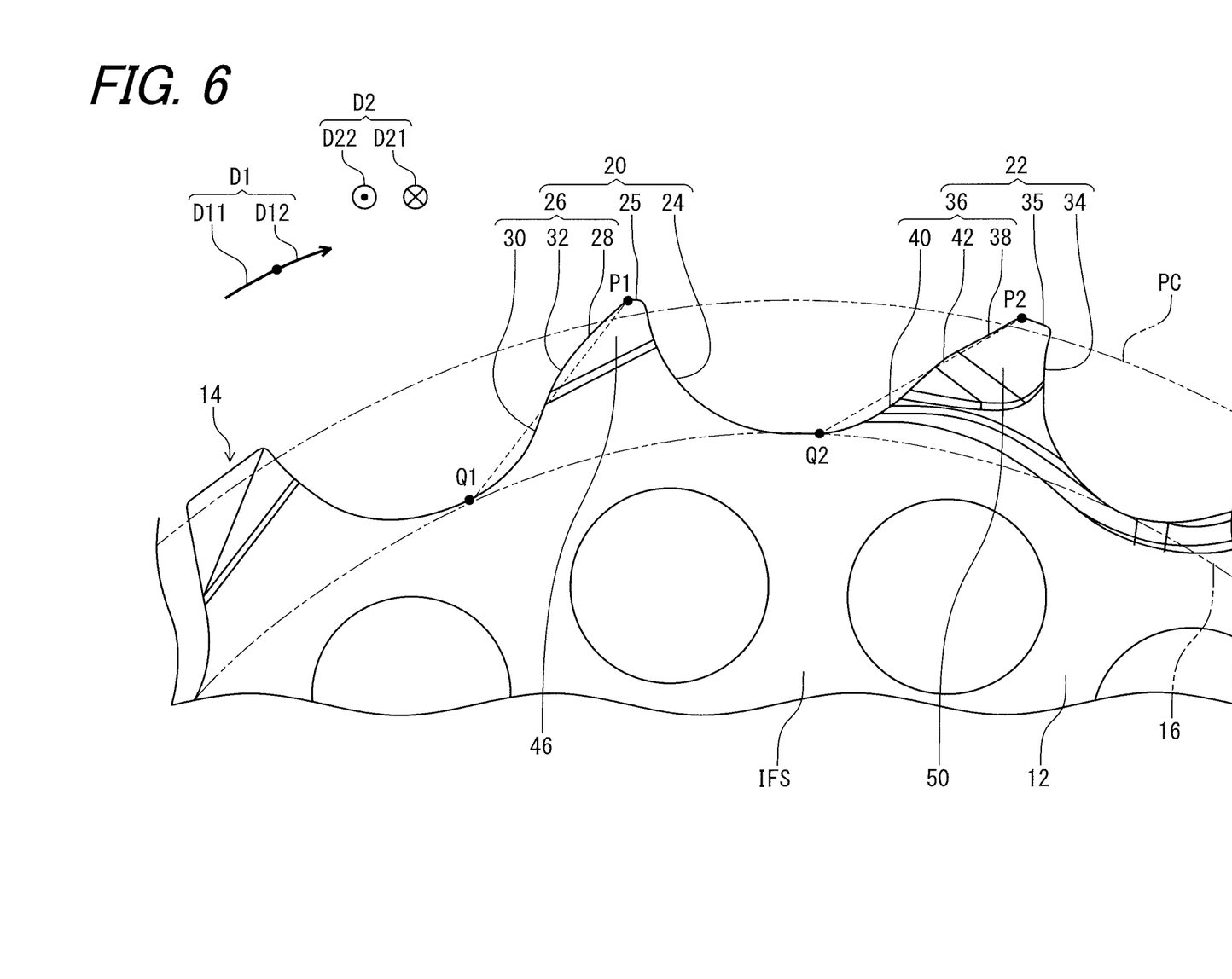
FIG. 6 is another partial side elevational view of the bicycle sprocket of the bicycle multiple sprocket assembly illustrated in FIG. 1.
Figure 7:
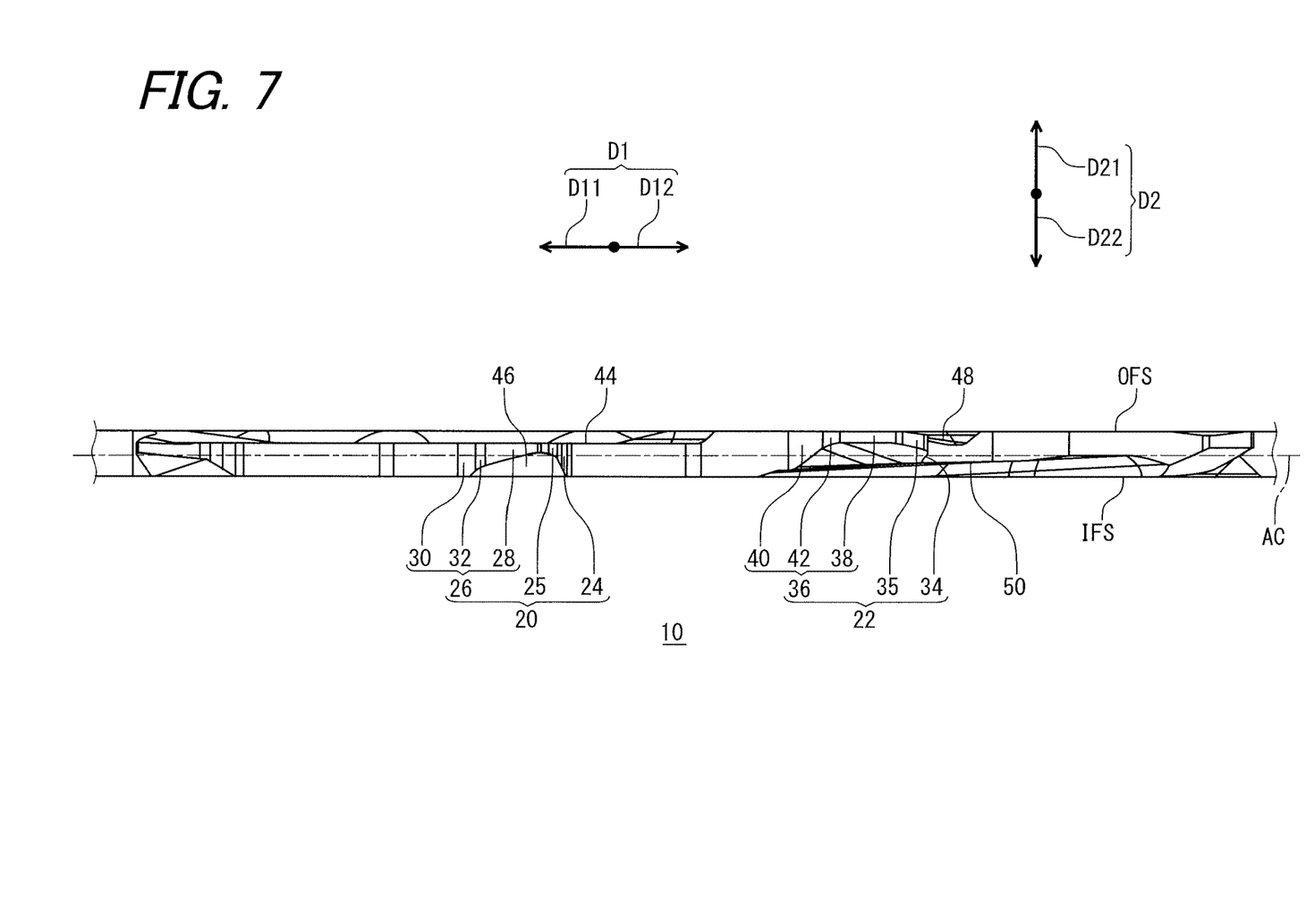
FIG. 7 is a partial plan view of the bicycle sprocket of the bicycle multiple sprocket assembly illustrated in FIG. 1.

FIGS. 5 to 7 are enlarged views illustrating one of the at least one first tooth 20 and the at least one second tooth 22. As seen in FIGS. 5 to 7, the at least one first tooth 20 has a first driving surface 24. The at least one first tooth 20 has a first non-driving surface 26 opposite to the first driving surface 24 in the circumferential direction D1 with respect to the rotational center axis A1 of the bicycle sprocket 10. The first driving surface 24 faces in a reversing rotational direction D12 opposite to the driving rotational direction D11. The first non-driving surface 26 faces in the driving rotational direction D11. Further, in the illustrated embodiment, the at least one first tooth 20 has a first tooth tip 25 connecting the first driving surface 24 and the first non-driving surface 26. However, the first tooth tip 25 can be omitted, and the first driving surface 24 can be directly connected to the first non-driving surface 26.

In the illustrated embodiment, the at least one first tooth 20 has a bevel cut in the first non-driving surface 26. Accordingly, the first non-driving surface 26 includes a first non-driving surface portion 28 and a second non-driving surface portion 30 so that a first ridge 32 is formed between the first non-driving surface portion 28 and the second non-driving surface portion 30. In the illustrated embodiment, the first ridge 32 has an outward convex shape. Accordingly, the first ridge 32 can be referred to as a first circumferential outward convex portion 32. Therefore, the first non-driving surface 26 includes the first circumferential outward convex portion 32. However, the first ridge 32 can have an acute shape.

As seen in FIGS. 5 and 6, the first non-driving surface 26 has a distal end P1 and a proximal end Q1. The proximal end Q1 is a radially innermost edge of the first non-driving surface 26 which is provided on the outer periphery 16 of the sprocket body 12. The distal end P1 is a radially outermost edge of the first non-driving surface 26. The first circumferential outward convex portion 32 is a portion of the first non-driving surface 26 which is provided radially outwardly from a reference line P1Q1 as viewed in the axial direction D2.

The first non-driving surface portion 28 is disposed radially outwardly from the second non-driving surface portion 30. The shapes of first non-driving surface portion 28 and the second non-driving surface portion 30 can be flat or curved. Preferably, the first non-driving surface portion 28 has an outward convex shape whose curvature is smaller than a curvature of the first circumferential outward convex portion 32, and the second non-driving surface portion 30 has an inward concave shape.

As seen in FIGS. 5 to 7, the at least one second tooth 22 has a second driving surface 34. The at least one second tooth 22 has a second non-driving surface 36 opposite to the second driving surface 34 in the circumferential direction D1. The second driving surface 34 faces in the reversing rotational direction D12. The second non-driving surface 36 faces in the driving rotational direction D11. Further, in the illustrated embodiment, the at least one second tooth 22 has a second tooth tip 35 connecting the second driving surface 34 and the second non-driving surface 36. However, the second tooth tip 35 can be omitted, and the second driving surface 34 can be directly connected to the second non-driving surface 36.

In the illustrated embodiment, the at least one second tooth 22 has a bevel cut in the second non-driving surface 36. Accordingly, the second non-driving surface 36 includes a third non-driving surface portion 38 and a fourth non-driving surface portion 40 so that a second ridge 42 is formed between the third non-driving surface portion 38 and the fourth non-driving surface portion 40. In the illustrated embodiment, the second ridge 42 has an outward convex shape. Accordingly, the second ridge 42 can be referred to as a second circumferential outward convex portion 42. Therefore, the second non-driving surface 36 includes the second circumferential outward convex portion 42. However, the second ridge 42 can have an acute shape.

As seen in FIGS. 5 and 6, the second non-driving surface 36 has a distal end P2 and a proximal end Q2. The proximal end Q2 is a radially innermost edge of the second non-driving surface 36 which is provided on the outer periphery 16 of the sprocket body 12. The distal end P2 is a radially outermost edge of the second non-driving surface 36. The second circumferential outward convex portion 42 is a portion of the second non-driving surface 36 which is provided radially outwardly from a reference line P2Q2 as viewed in the axial direction D2.

The third non-driving surface portion 38 is disposed radially outwardly from the fourth non-driving surface portion 40. The shapes of third non-driving surface portion 38 and the fourth non-driving surface portion 40 can be flat or curved. Preferably, the third non-driving surface portion 38 has an outward convex shape whose curvature is smaller than a curvature of the second circumferential outward convex portion 42, and the fourth non-driving surface portion 40 has an inward concave shape.

As seen in FIGS. 5 and 6, the first ridge 32 and the second ridge 42 are disposed radially inwardly from a pitch circle PC of the bicycle sprocket 10 with respect to the rotational center axis A1. In other words, each of at least a part of the first circumferential outward convex portion 32 and at least a part of the second circumferential outward convex portion 42 is disposed radially inwardly from the pitch circle PC of the bicycle sprocket 10 with respect to the rotational center axis A1. However, at least one of the first ridge 32 and the second ridge 42 can be disposed radially outwardly from the pitch circle PC. At least one of the first circumferential outward convex portion 32 and the second circumferential outward convex portion 42 can be disposed radially outwardly from the pitch circle PC of the bicycle sprocket 10 with respect to the rotational center axis A1. The pitch circle PC is a circle connecting center axes of link pins C1 (See FIG. 11, for example) of the bicycle chain C in a state where the bicycle chain C engages with the bicycle sprocket 10. Each of the second non-driving surface portion 30 and the fourth non-driving surface portion 40 is disposed radially inwardly from the pitch circle PC of the bicycle sprocket 10. Each of at least a part of the first non-driving surface portion 28 and the third non-driving surface portion 38 is disposed radially inwardly from the pitch circle PC of the bicycle sprocket 10.

Figure 8:
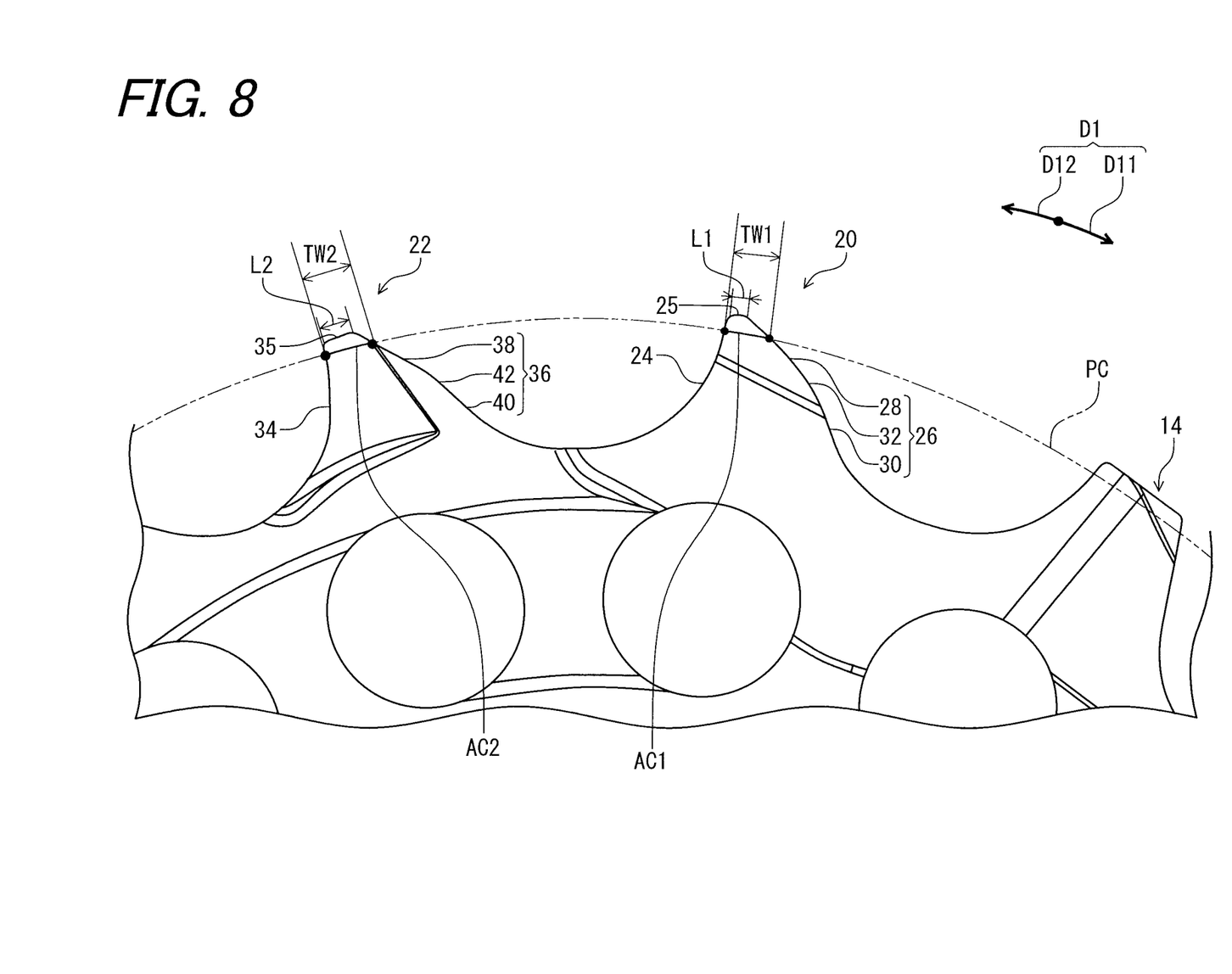
FIG. 8 is a partial side elevational view of the bicycle sprocket of the bicycle multiple sprocket assembly illustrated in FIG. 1.

As seen in FIG. 8, the at least one first tooth 20 has a first tooth width TW1 along a first circular arc AC1 provided in the pitch circle PC of the bicycle sprocket 10 between the first driving surface 24 and the first non-driving surface 26 in the circumferential direction D1. The at least one second tooth 22 has a second tooth width TW2 along a second circular arc AC2 provided in the pitch circle PC between the second driving surface 34 and the second non-driving surface 36 in the circumferential direction D1. In the illustrated embodiment, each of the first tooth width TW1 and the second tooth width TW2 is equal to or shorter than 1.5 mm. However, each of the first tooth width TW1 and the second tooth width TW2 is not limited to this embodiment, and at least one of the first tooth width TW1 and the second tooth width TW2 can be longer than 1.5 mm.

Further, the first tooth tip 25 has a first length L1 in the circumferential direction D1. The second tooth tip 35 has a second length L2 in the circumferential direction D1. In the illustrated embodiment, the second length L2 is different from the first length L1. More specifically, the second length L2 is longer than the first length L1 Each of the first length L1 and the second length L2 is equal to or shorter than 1.0 mm. However, features of the first length L1 and the second length L2 are not limited to the above embodiment. The first length L1 can be equal to the second length L2. The second length L2 can be shorter than the first length L1. At least one of the first length L1 and the second length L2 can be longer than 1.0 mm.

Figure 9:
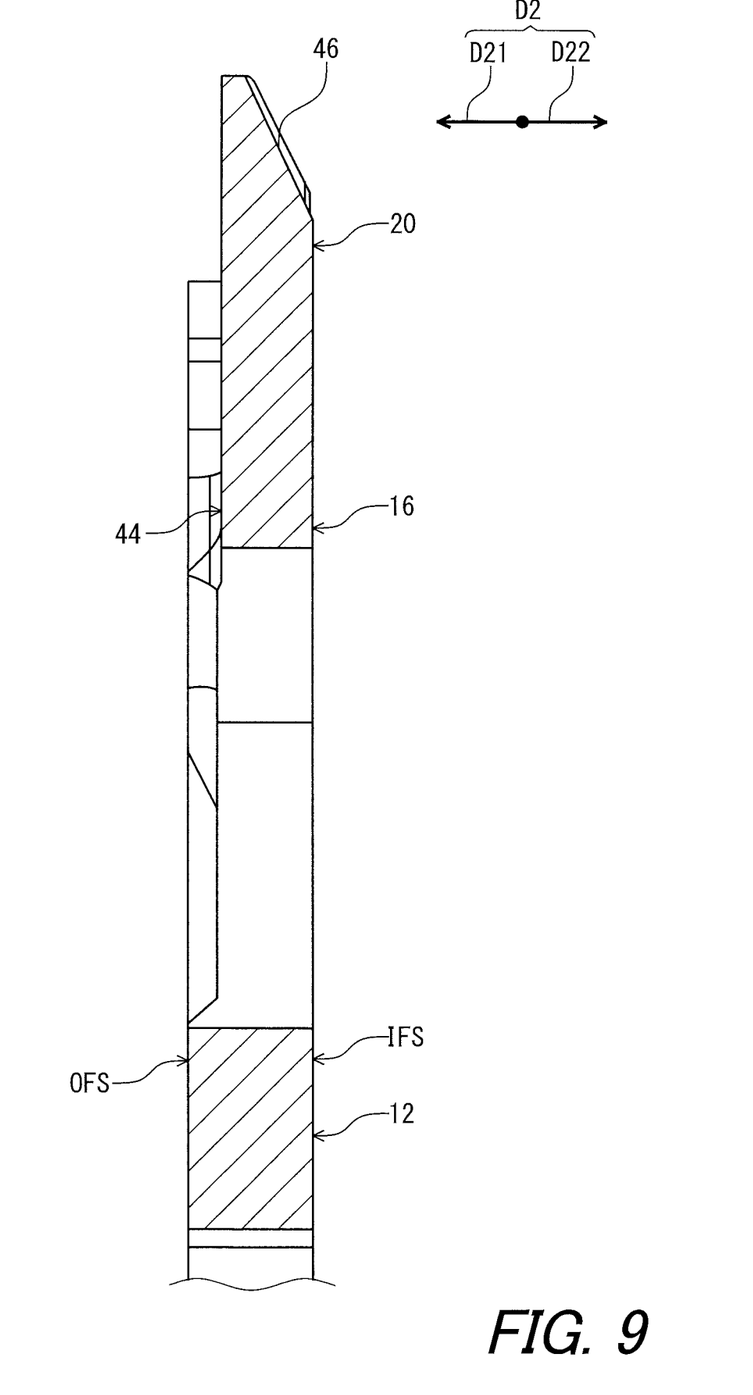
FIG. 9 is a cross-sectional view of the bicycle sprocket illustrated in FIGS. 3 and 4 as seen along section line IX-IX of FIGS. 3 and 4.

As seen in FIGS. 5, 7, and 9, the at least one first tooth 20 includes an axially outward recess 44 provided on the outward facing side OFS facing in the axial direction D2 to facilitate the inward shifting operation in which the bicycle chain C is shifted from a smaller sprocket (e.g. S11) to the bicycle sprocket 10. As seen in FIG. 5, the axially outward recess 44 extends from the at least one first tooth 20 to the sprocket body 12. More specifically, the axially outward recess 44 extends across the outer periphery 16 of the sprocket body 12. Further, as seen in FIGS. 6, 7, and 9, the at least one first tooth 20 includes an inward chamfer 46 provided on the inward facing side IFS facing in the axial direction D2. The inward chamfer 46 is provided in a tip end of the at least one first tooth 20 to facilitate the inward shifting operation. However, the at least one first tooth 20 may not include the axially outward recess 44, and the at least one first tooth 20 may not include the inward chamfer 46.

Figure 10:
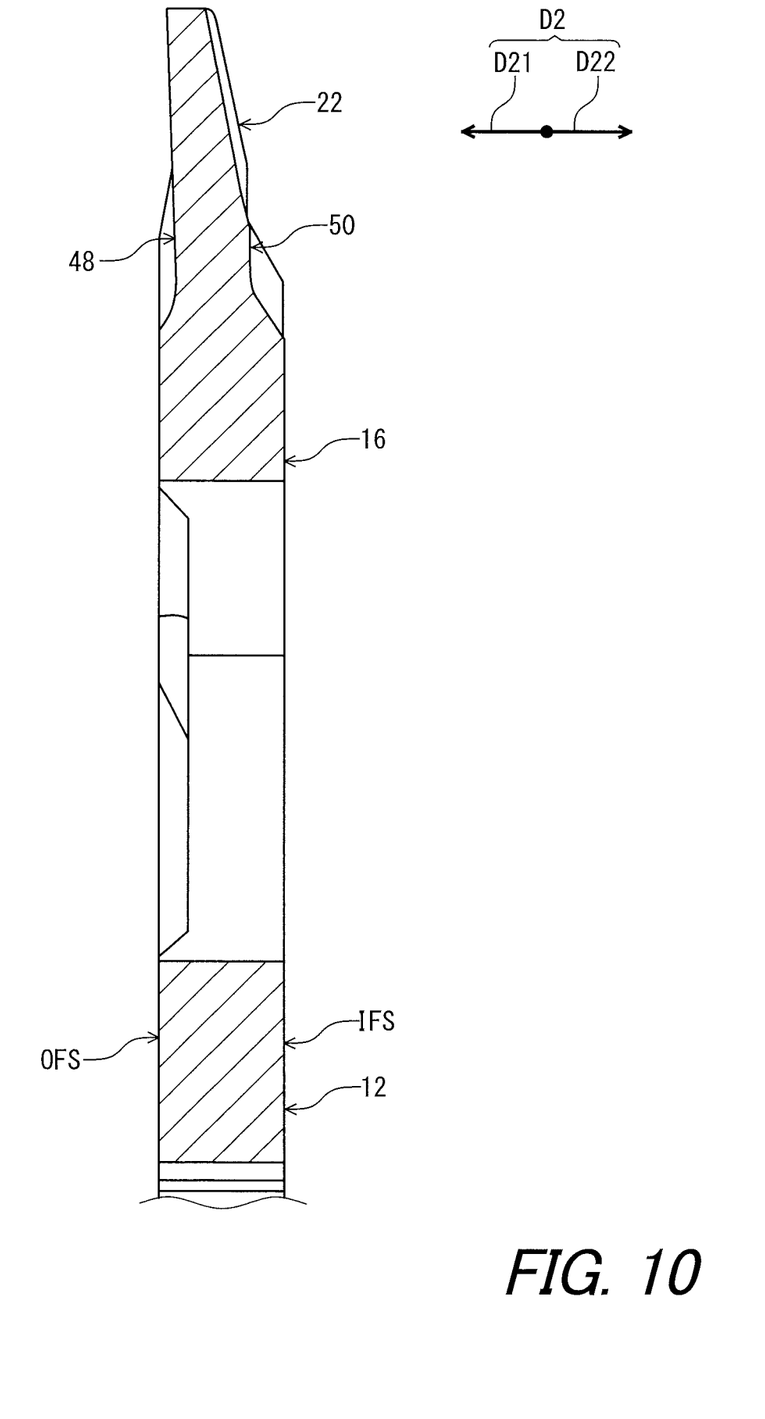
FIG. 10 is a cross-sectional view of the bicycle sprocket illustrated in FIGS. 3 and 4 as seen along section line X-X of FIGS. 3 and 4.

As seen in FIGS. 5, 7, and 10, the at least one second tooth 22 includes an additional axially outward recess 48 provided on the outward facing side OFS facing in the axial direction D2 to facilitate the inward shifting operation. Further, as seen in FIGS. 6, 7, and 10, the at least one second tooth 22 includes an inward recess 50 provided on the inward facing side IFS facing in the axial direction D2 to facilitate the inward shifting operation. Additionally, the inward recess 50 can be configured to facilitate the outward shifting operation. Therefore, the inward recess 50 can be configured to facilitate the shifting operation.

Figure 11:
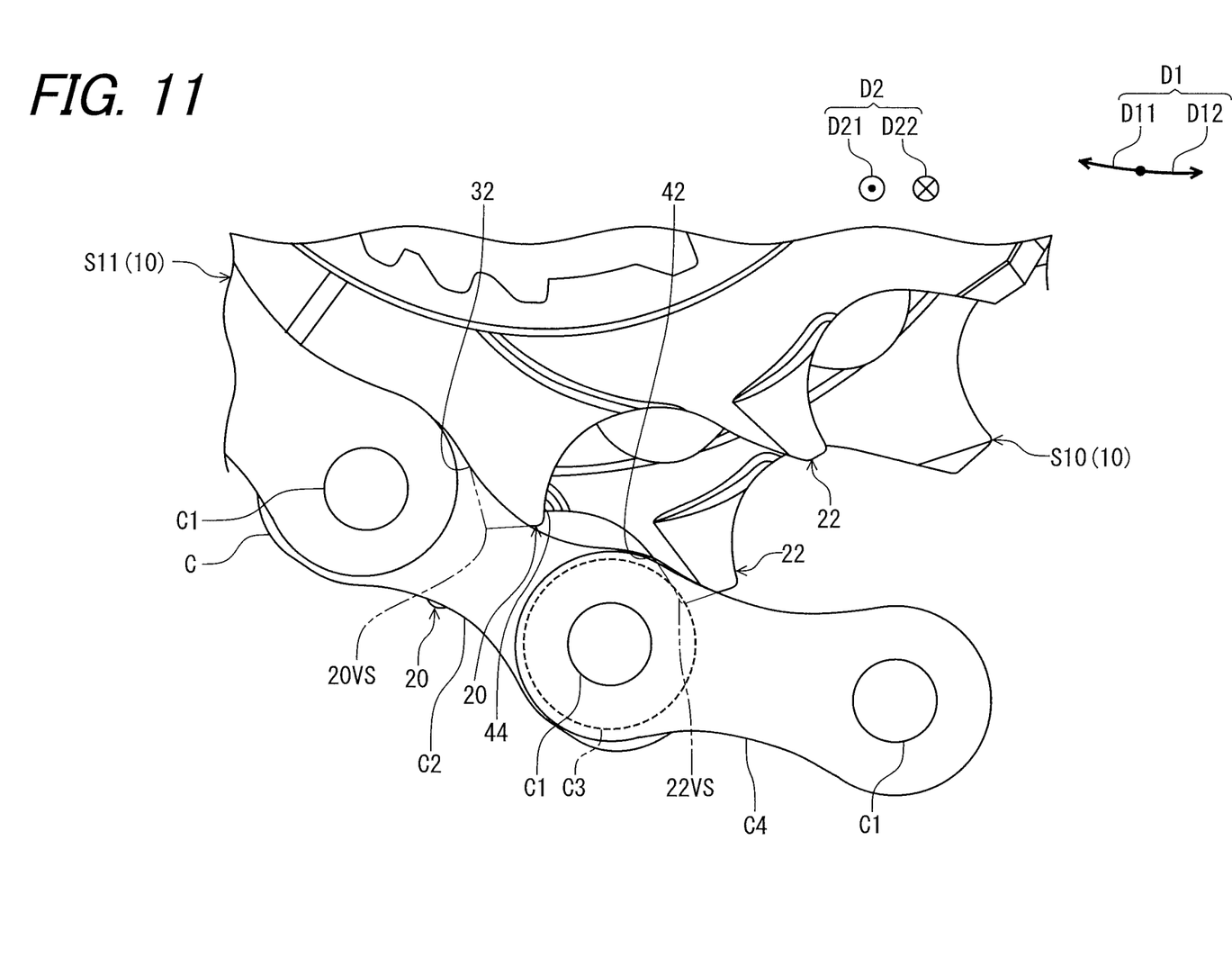
FIG. 11 is a partial side elevational view of the bicycle sprockets for showing an advantageous effect.

With the bicycle sprocket 10, not only the at least one first tooth 20 but also the at least one second tooth 22 include ridges 32 and 42 (circumferential outward convex portions 32 and 42). FIG. 11 shows an advantage effect of this feature, FIG. 11 shows an example in which each of the bicycle sprocket S10 and the bicycle sprocket S11 (the adjacent smaller bicycle sprocket of the bicycle sprocket S10) have features of the bicycle sprocket 10. In FIG. 11, a two-dot chain line 20VS shows a shape of the first tooth tip 25 and the first non-driving surface 26 in case there is no ridge 32 formed in the at least one first tooth 20, and a two-dot chain line 22VS shows a shape of the second tooth tip 35 and the second non-driving surface 36 in case there is no ridge 42 formed in the at least one second tooth 22. If there is no ridge 32 formed in the at least one first tooth 20 of the adjacent smaller bicycle sprocket S11, the at least one first tooth 20 may contact an outer link plate C2 of the bicycle chain C in the inward shifting operation (see the two-dot chain line 20VS overlaps with the outer link plate C2) to interfere with the inward shifting movement of the bicycle chain C. Accordingly, cutting the first tooth tip 25 and the first non-driving surface 26 of the at least one first tooth 20 to provide the first ridge 32 (the first circumferential outward convex portion 32) facilitates the inward shifting operation. Further, if there is no ridge 42 formed in the at least one second tooth 22 of the bicycle sprocket S10, the at least one second tooth 22 may contact a roller C3 of the bicycle chain C (see the two-dot chain line 22VS overlaps with the roller C3) before the bicycle chain C engages with the at least one second tooth 22 (the at least one second tooth 22 is disposed between a pair of outer link plates C4 of the bicycle chain C) in the inward shifting operation. Accordingly, cutting the second tooth tip 35 and the second non-driving surface 36 of the at least one second tooth 22 to provide the second ridge 42 (the second circumferential outward convex portion 42) can avoid the interference to interfere with the inward shifting movement of the bicycle chain C to facilitate the inward shifting operation.

Further, in a case where the axially outward recess 44 is provided in the at least one first tooth 20 as seen in FIG. 11, the bicycle chain C is configured to be provided on the axially outward recess 44 in the inward shifting operation. Accordingly, it is possible for the bicycle chain C to move close to an axial center AC (See FIG. 7) of the bicycle sprocket 10 in the inward shifting operation to facilitate inward shifting operation.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a sprocket body; and
   a plurality of sprocket teeth provided on an outer periphery of the sprocket body, the plurality of sprocket teeth including:
   at least one first tooth having a first driving surface, a first non-driving surface opposite to the first driving surface in a circumferential direction with respect to a rotational center axis of the bicycle sprocket, and a first tooth tip connecting the first driving surface and the first non-driving surface, the first non-driving surface having a first distal end and a first proximal end, the first proximal end being a radially innermost edge of the first non-driving surface, the first distal end being a radially outermost edge of the first non-driving surface and connected to the first tooth tip, the first non-driving surface including a first non-driving surface portion and a second non-driving surface portion so that a first ridge is formed between the first non-driving surface portion and the second non-driving surface portion, the first ridge being provided radially outwardly from a first reference line connecting the first distal end and the first proximal end; and at least one second tooth configured to initially engage with the bicycle chain in a shifting operation where the bicycle chain shifts from an adjacent smaller bicycle sprocket to the bicycle sprocket, the at least one second tooth being disposed adjacent to the at least one first tooth without any tooth between the at least one first tooth and the at least one second tooth in the circumferential direction such that the first driving surface is provided between the at least one second tooth and the first non-driving surface in the circumferential direction, the at least one second tooth having a second driving surface, a second non-driving surface opposite to the second driving surface in the circumferential direction, and a second tooth tip connecting the second driving surface and the second non-driving surface, the second non-driving surface having a second distal end and a second proximal end, the second proximal end being a radially innermost edge of the second non-driving surface, the second distal end being a radially outermost edge of the second non-driving surface and connected to the second tooth tip, the second non-driving surface including a third non-driving surface portion and a fourth non-driving surface portion so that a second ridge is formed between the third non-driving surface portion and the fourth non-driving surface portion, the second ridge being provided radially outwardly from a second reference line connecting the second distal end and the second proximal end.

2. A bicycle sprocket comprising:

a sprocket body; and a plurality of sprocket teeth provided on an outer periphery of the sprocket body, the plurality of sprocket teeth including:

at least one first tooth having a first driving surface, a first non-driving surface opposite to the first driving surface in a circumferential direction with respect to a rotational center axis of the bicycle sprocket, and a first tooth tip connecting the first driving surface and the first non-driving surface, the first non-driving surface having a first distal end and a first proximal end, the first proximal end being a radially innermost edge of the first non-driving surface, the first distal end being a radially outermost edge of the first non-driving surface and connected to the first tooth tip, the first non-driving surface including a first circumferential outward convex portion provided radially outwardly from a first reference line connecting the first distal end and the first proximal end; and at least one second tooth configured to initially engage with the bicycle chain in a shifting operation where the bicycle chain shifts from an adjacent smaller bicycle sprocket to the bicycle sprocket, the at least one second tooth being disposed adjacent to the at least one first tooth without any tooth between the at least one first tooth and the at least one second tooth in the circumferential direction such that the first driving surface is provided between the at least one second tooth and the first non-driving surface in the circumferential direction, the at least one second tooth having a second driving surface, a second non-driving surface opposite to the second driving surface in the circumferential direction, and a second tooth tip connecting the second driving surface and the second non-driving surface, the second non-driving surface having a second distal end and a second proximal end, the second proximal end being a radially innermost edge of the second non-driving surface, the second distal end being a radially outermost edge of the second non-driving surface and connected to the second tooth tip, the second non-driving surface including a second circumferential outward convex portion provided radially outwardly from a second reference line connecting the second distal end and the second proximal end.

3. The bicycle sprocket according to claim 1, wherein the at least one second tooth is disposed at an upstream side of the at least one first tooth in a driving rotational direction of the bicycle sprocket.

4. The bicycle sprocket according to claim 1, wherein the first ridge and the second ridge are disposed radially inwardly from a pitch circle of the bicycle sprocket with respect to the rotational center axis.

5. The bicycle sprocket according to claim 2, wherein each of at least a part of the first circumferential outward convex portion and at least a part of the second circumferential outward convex portion is disposed radially inwardly from a pitch circle of the bicycle sprocket with respect to the rotational center axis.

6. The bicycle sprocket according to claim 1, wherein the at least one first tooth has a first tooth width along a first circular arc provided in a pitch circle of the bicycle sprocket between the first driving surface and the first non-driving surface in the circumferential direction, the at least one second tooth has a second tooth width along a second circular arc provided in the pitch circle between the second driving surface and the second non-driving surface in the circumferential direction, and each of the first tooth width and the second tooth width is equal to or shorter than 1.5 mm.

7. The bicycle sprocket according to claim 1, wherein the first tooth tip has a first length in the circumferential direction, the second tooth tip has a second length in the circumferential direction, and each of the first length and the second length is equal to or shorter than 1.0 mm.

8. The bicycle sprocket according to claim 1, wherein the first tooth tip has a first length in the circumferential direction, and the second tooth tip has a second length different from the first length in the circumferential direction.

9. The bicycle sprocket according to claim 8, wherein the second length is longer than the first length.

10. The bicycle sprocket according to claim 1, wherein the bicycle sprocket includes an outward facing side facing in an axial direction parallel to the rotational center axis and an inward facing side facing in the axial direction, the inward facing side being opposite to the outward facing side in the axial direction, the at least one first tooth includes an axially outward recess provided on an outward facing side facing in the axial direction to facilitate an inward shifting operation in which the bicycle chain is shifted from a smaller sprocket to the bicycle sprocket.

* * * * *